C. BAKER.
SHEARS.
APPLICATION FILED NOV. 1, 1919.

1,357,437.

Patented Nov. 2, 1920.

INVENTOR
Charles Baker

WITNESSES
W. C. Fielding
J. P. Campbell

BY Richard B. Owen.

ATTORNEY

UNITED STATES PATENT OFFICE.

CHARLES BAKER, OF HARTFORD, WISCONSIN, ASSIGNOR OF ONE-TENTH TO ALBERT J. HOLZBAUER, OF MILWAUKEE, WISCONSIN.

SHEARS.

1,357,437.      Specification of Letters Patent.      Patented Nov. 2, 1920.

Application filed November 1, 1919. Serial No. 335,011.

*To all whom it may concern:*

Be it known that I, CHARLES BAKER, a citizen of the United States, residing at Hartford, in the county of Washington and State of Wisconsin, have invented certain new and useful Improvements in Shears, of which the following is a specification.

My invention relates to new and useful improvements in shears.

The primary object of the invention is the provision of shears which are simple and inexpensive in construction and which are particularly adapted for metal workers for cutting tin or other similar materials.

A further object of the invention is the provision of shears having offset handles whereby the handles are out of alinement with the cutting blades of the shears.

Figure 1:
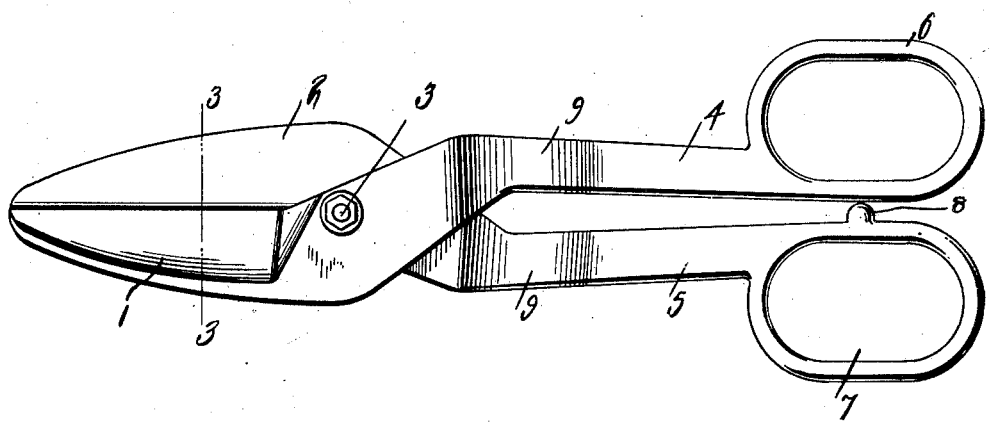
Figure 2:
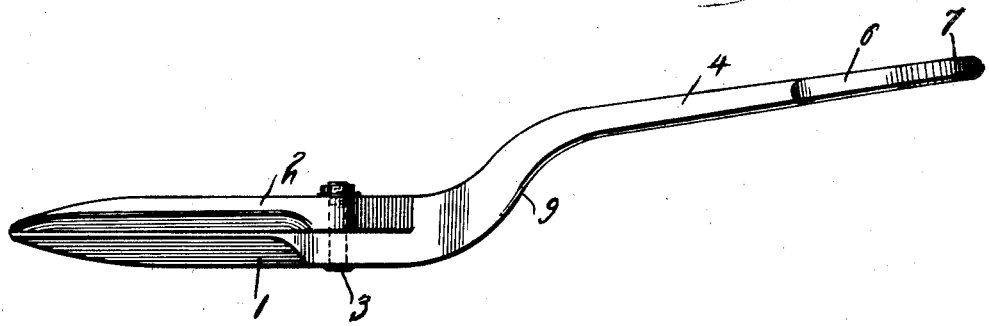
Figure 3:

With these and other objects in view the invention consists in the novel details of construction and arrangement of parts which will be more clearly understood from the following description and drawings, in which, Figure 1 is a side view of the shears, Fig. 2 is a top plan view, and Fig. 3 is a vertical section, through the cutting blades, on the line 3—3 of Fig. 1.

In the drawing the numeral 1 indicates the lower cutting blade and 2 the upper blade, said blades being pivotally connected by means of the usual screw-bolt indicated at 3. A handle 4 is formed integral with the cutting blade 1 and a handle 5 is formed integral with the cutting blade 2 and these handles cross as is clearly indicated in Fig. 1 of the drawing whereby the handle 4 will be the uppermost and the handle 5 the lowermost. The handle 4 is provided with an elongated opening indicated at 6 adapted to receive the thumb of the user and the handle 7 is provided with an elongated opening to receive the fingers. A button or projection 8 is formed on the handle 5 for limiting the movement of the handle. This projection 8 is adapted to engage the underside of the handle 4, as is more particularly shown in Fig. 1 of the drawing.

Each of the handles is curved, as indicated at 9, whereby the handles will be offset from the blades, or in other words, out of alinement with the blades. As is more clearly illustrated in Fig. 2 of the drawing, the handles are also, preferably extended at an angle, the purpose of which will be presently described.

As indicated in Fig. 3 of the drawing, the blades 1 and 2 extend at a slight angle whereby the abutting edges meet at an angle to form a good cutting edge or shearing surface.

Having fully described the details of construction it is thought that the advantages and operation of my shears will be clearly understood. As stated in the objects of the invention, my shears are primarily intended for the use of metal workers in cutting tin or similar material. It is often necessary to cut the edges of tin plates or pipes and considerable difficulty and annoyance has been experienced in that the hands are often cut by the edges of such tin. It is to overcome such disadvantages that I offset the handles as is more clearly indicated in Fig. 2 of the drawing. As is shown and described the handles extend on a line different from that of the blades and in cutting metal of various characters the handles will be some distance therefrom whereby the hands will not come in contact with the edges of the metal. The handles are offset to such an extent that sufficient space will be left for the fingers and thumb, so that they will not contact with the metal being cut. The shears, constructed as above described, may be used for cutting metal or strips of metal or equally as well used for cutting pipes or other circularly formed metal and the offset of the handles will be of equal advantages in either use of the shears.

Having fully described my invention what I claim as new and desire to secure by Letters Patent is:

A pair of shears comprising blades pivotally connected together, curved extensions formed on the blades, and handles formed on the curved extensions so as to extend out of alinement with and substantially parallel to the blades.

In testimony whereof I affix my signature in presence of two witnesses.

CHARLES BAKER.

Witnesses:

ALOIS S. MEMMEL,
A. J. HOLZBAUER.